June 15, 1954

W. C. WANDROIK 2,681,242

SANDING DEVICE

Filed June 23, 1952

Walter C. Wandroik
INVENTOR.

BY
*Clarence A. O'Brien*
*and Harvey B. Jackson*
Attorneys

June 15, 1954

W. C. WANDROIK 2,681,242

SANDING DEVICE

Filed June 23, 1952

Walter C. Wandroik
INVENTOR.

BY *Clarence A. O'Brien*
*and Harvey B. Jacobson*
Attorneys

Patented June 15, 1954

2,681,242

UNITED STATES PATENT OFFICE 2,681,242

SANDING DEVICE

Walter C. Wandroik, Morton Grove, Ill.

Application June 23, 1952, Serial No. 294,983

5 Claims. (Cl. 291—33)

This invention relates to new and useful sand dispensers for vehicles and the primary object of the present invention is to provide a sanding device mountable within the luggage compartment of a vehicle and having a motor actuator switch mountable on the floor board of a vehicle so that sand may be dispensed in front of the rear wheels of the vehicle when the driver of the vehicle actuates the switch.

Another important object of the present invention is to provide a sanding device including a pair of feed screws and a removable power unit operatively connected to the screws for driving the same as a unit.

A further object of the present invention is to provide a sanding apparatus, for vehicles, of the aforementioned character wherein the power unit is composed of a novel gear drive arrangement with reinforcing and strengthening means for the gear drive.

A still further aim of the present invention is to provide a sanding device that is simple and practical in construction, strong and reliable in use, small and compact in structure, efficient and durable in operation, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 1:
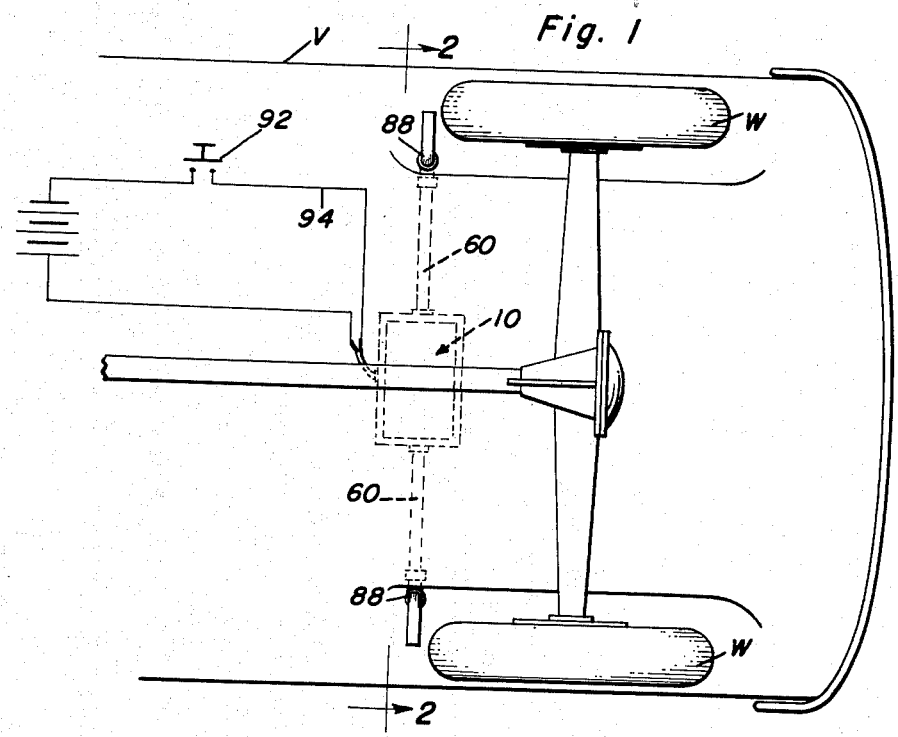
Figure 1 is a fragmentary bottom plan view of a vehicle with the invention mounted thereon and showing diagrammatically the electrical circuit forming part of the invention.
Figure 2:
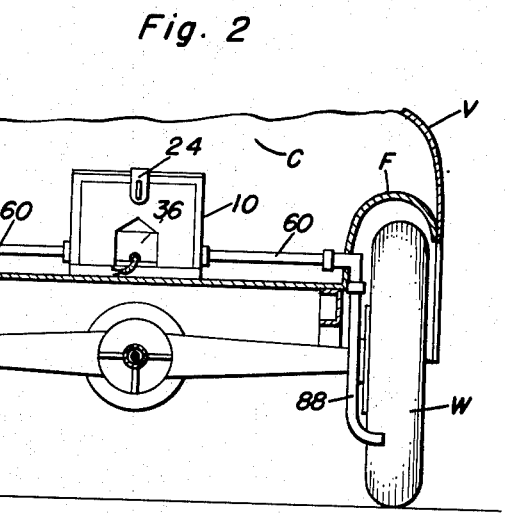
Figure 2 is a transverse vertical sectional view taken substantially on the plane of section line 2—2 of Figure 1.
Figure 3:
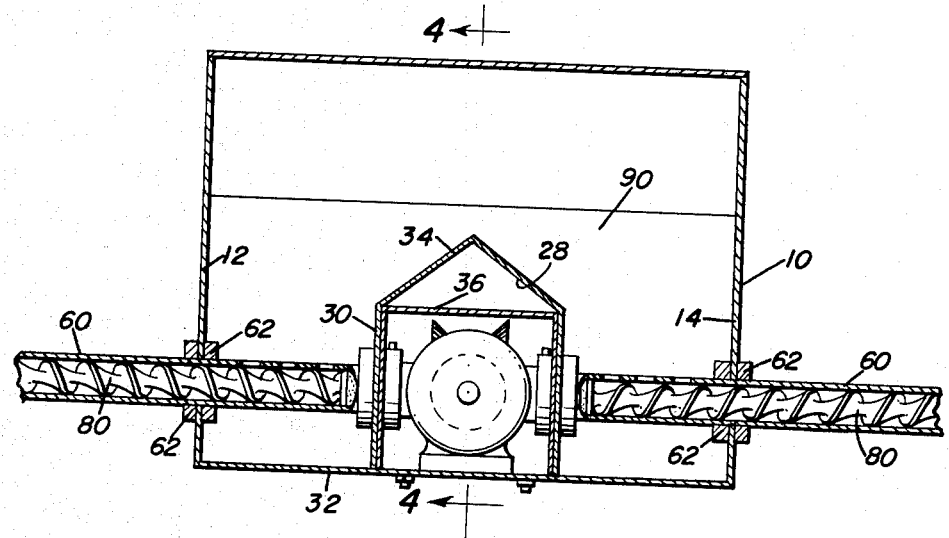
Figure 3 is an enlarged fragmentary view of Figure 2 and with parts broken away and shown in section for the convenience of explanation.
Figure 4:
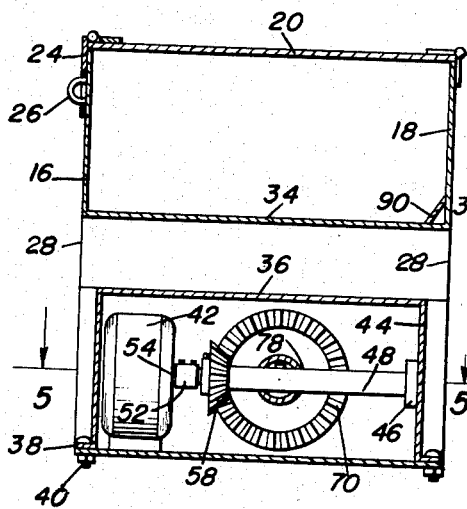
Figure 4 is a vertical sectional view taken substantially on the plane of section line 4—4 of Figure 3.
Figure 5:
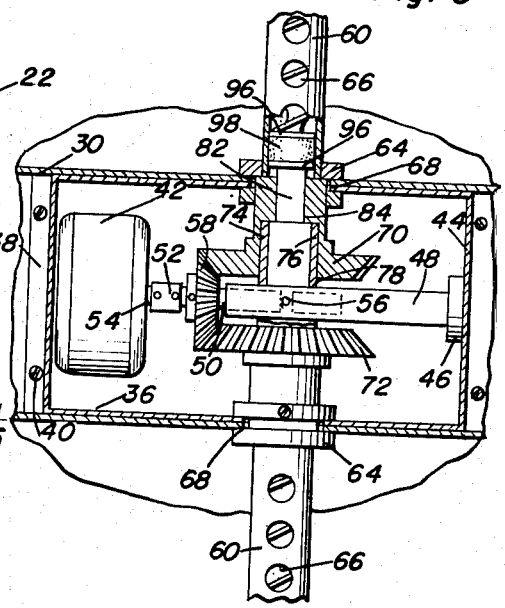
Figure 5 is an enlarged horizontal sectional view taken substantially on the plane of section line 5—5 of Figure 4.
Figure 6:
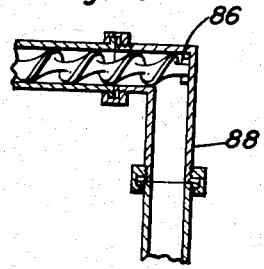
Figure 6 is an enlarged fragmentary view of Figure 2 and showing the conduit and conveying means used in the invention.

Referring now to the drawings in detail, wherein for the purpose of illustration, there is disclosed a preferred embodiment of the present invention, the numeral 10 represents an elongated housing having spaced side walls 12 and 14, a front wall 16 and a rear wall 18. The upper wall 20 of the housing 10 is hinged, as at 22, to the rear wall 18 and carries a hasp 24 engageable with an eye 26 on the front wall, so that a lock engaged in the eye 26 will retain the closure or wall 20 in its closed position.

The forward and rear walls 16 and 18 are provided with registering openings 28. A casing member 30 is fixed to the bottom wall 32 of the housing 10 and extends between the walls 16 and 18. The open ends of the casing member 30 register with the openings 28. The casing member 30 is provided with an inverted V-shaped top wall 34 forming a deflector for abrasive material, such as sand, placed in the housing.

An open bottom casing 36 is disposed within the member 30 and includes flanges 38 that are removably secured to the bottom wall 32 by fasteners 40. An electric motor 42 is suitably removably secured to the bottom wall 32 and faces the end wall 44 of the casing 36 on which there is supported a bearing 46 for one end of a tubular supporting shaft 48. A coupling shaft 50 is secured by a coupling element 52 to the armature shaft 54 of the motor and extends into the shaft 48. A retaining screw 56 extends radially into the shaft 48 and enters a groove in the shaft 50. A drive, beveled gear 58 is fixedly attached to shaft 50 for rotation therewith.

The inner ends of a pair of coaxial horizontal conduits or tubes 60 extend inwardly through apertures in the side walls of housing 10 and are held thereto by inner and outer lock rings 62 having internal set screws. The inner ends of the tubes 60 are positioned in bearing rings 64 on the side walls of the member 30. Spaced apertures 66 are provided in the upper peripheries of the tubes 60 adjacent the rings 64 to receive sand placed in the housing.

Registering openings 68 in the juxtaposed walls of the member 30 and casing 36 rotatably receive the hub portions of beveled gears 70 and 72 that mesh with gear 58. The gears 70 and 72 are formed with central recesses 74 that receive the ends of a tubular member 76 having a central transverse aperture 78 through which the shaft 50 extends.

Conveyor screws 80 extend through the tubes 60 and their inner multi-sided ends 82 enter multi-sided sockets 84 in the hubs of the gears 70 and 72. The outer ends of the screws 80 are rotatably supported in bearings 86 in the angulated portions 88 of the tubes 60.

A downwardly and forwardly inclined baffle 90 is suitably fixed in housing 10 and slopes toward the inner end portions of tubes 60. The baffle 90 is formed with a central opening accommodating the casing member 30.

Housing 10 is suitably mounted within the luggage compartment C of a vehicle V and the angulated portions 88 extend through the fenders F and terminate in front of the rear wheels W of the vehicle. The motor is connected to the battery of the vehicle and to a switch 92 by conductors 94. The switch 92 is mounted on the floor board of the vehicle adjacent the brake pedal, whereby the driver may actuate the motor to cause rotation of the feed screws for conveying sand to the ground in front of the rear wheels.

In order to prevent sand from backing up in the tubes 60, the inner end portions of the screws 80 supports pairs of washers 96 between which is disposed a resilient sleeve 98 that will engage the inner peripheries of the tubes 60.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A sanding device for vehicles comprising a housing having a casing member therein and a pair of spaced parallel side walls, a pair of coaxial tubes having inner perforated ends extending through said side walls and into the housing, said perforations being in the upper portions of said tubes, a pair of feed screws rotatably supported in the tubes for conveying abrasive material in the housing through the tubes, the outer ends of said tubes being provided with outlet means adapted to be disposed in front of the driving wheels of a vehicle, and power means in the casing member and operatively connected to the screws for rotating the latter.

2. A sanding device for vehicles comprising a housing having a casing member therein and a pair of spaced parallel side walls, a pair of coaxial tubes having inner perforated ends extending through said side walls and into the housing, said perforations being in the upper portions of said tubes, a pair of feed screws rotatably supported in the tubes for conveying abrasive material in the housing through the tubes, the outer ends of said tubes being provided with outlet means adapted to be disposed in front of the driving wheels of a vehicle, an electric motor in the casing member, a drive gear on the armature shaft of the motor, and a pair of driven beveled gears on the adjacent ends of the screws meshing with the drive gear.

3. In a vehicle having a luggage compartment with a bottom wall, a sanding device mounted within the compartment and including a housing having a compartment therein with an inverted V-shaped upper wall, a pair of coaxial tubes having inner perforated ends extending into the housing and having angulated outer ends terminating in front of the rear wheels of the vehicle, said perforations being in the upper portions of said tubes, feed screws rotatably supported within the tubes and having inner ends extending into the compartment, and power means in the compartment operatively connected to the inner ends of screws.

4. In a vehicle having a luggage compartment with a bottom wall, a sanding device mounted within the compartment and including a housing having a compartment therein with an inverted V-shaped upper wall, a pair of coaxial tubes having inner perforated ends extending into the housing and having angulated outer ends terminating in front of the rear wheels of the vehicle, said perforations being in the upper portions of said tubes, feed screws rotatably supported within the tubes and having inner ends extending into the compartment, and power means in the compartment operatively connected to the inner ends of screws, and resilient sleeves held on the inner end portions of the screws and contacting the inner periphery of the tubes at the inner ends thereof to prevent the backing up of abrasive material in the tubes.

5. A sanding device for vehicles comprising a housing having a casing member therein and a pair of spaced parallel side walls, a pair of coaxial tubes having inner perforated ends extending through said side walls and into the housing, said perforations being in the upper portions of said tubes, a pair of feed screws rotatably supported in the tubes for conveying abrasive material in the housing through the tubes, the outer ends of said tubes being provided with outlet means adapted to be disposed in front of the driving wheels of a vehicle, and power means in the casing member and operatively connected to the screws for rotating the latter, said power means including an electric motor having an armature shaft, said compartment having an end wall facing the motor, a tubular section rotatably supported on said end wall and coupled to the armature shaft, a tubular member having a central transverse opening receiving the tubular section, a drive gear on the armature shaft, a pair of beveled gears coupled to the screws and rotatably supported on the side walls, said pair of gears having opposed recesses accommodating the ends of the tubular member, and said pair of gears meshing with said drive gear.

References Cited in the file of this patent

UNITED STATES PATENTS

| Number | Name | Date |
|---|---|---|
| 1,427,535 | Lamping et al. | Aug. 29, 1922 |
| 2,033,322 | Boyer et al. | Mar. 10, 1936 |
| 2,221,777 | Chapman | Nov. 19, 1940 |
| 2,256,288 | McCune | Sept. 16, 1941 |

FOREIGN PATENTS

| Number | Country | Date |
|---|---|---|
| 63,230 | Austria | Jan. 26, 1914 |